United States Patent
Nge et al.

(10) Patent No.: US 11,592,888 B2
(45) Date of Patent: *Feb. 28, 2023

(54) HIGHLY CONFIGURABLE POWER-DELIVERY MANAGEMENT POLICY

(71) Applicant: Intel Corporation, Santa Clara, CA (US)

(72) Inventors: Chee Lim Nge, Beaverton, OR (US); James Hermerding, II, Vancouver, WA (US); Zhongsheng Wang, Portland, OR (US); Pranava Alekal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/306,778

(22) Filed: May 3, 2021

(65) Prior Publication Data

US 2021/0318741 A1 Oct. 14, 2021

Related U.S. Application Data

(63) Continuation of application No. 16/370,930, filed on Mar. 30, 2019, now Pat. No. 11,009,932.

(51) Int. Cl.
*G06F 1/00* (2006.01)
*G06F 1/3203* (2019.01)
*H04W 92/18* (2009.01)

(52) U.S. Cl.
CPC ........... *G06F 1/3203* (2013.01); *H04W 92/18* (2013.01)

(58) Field of Classification Search
CPC ........ G06F 1/26; G06F 1/3203; G06F 1/3234; G06F 1/266; G06F 1/206; H04W 92/18; Y02D 10/00
See application file for complete search history.

(56) References Cited

U.S. PATENT DOCUMENTS

| 10,646,084 B2 | 5/2020 | Hinchcliffe et al. |
| 2013/0332668 A1 | 12/2013 | Diep et al. |
| 2019/0227612 A1 | 7/2019 | Nge et al. |

FOREIGN PATENT DOCUMENTS

| JP | 2008084095 | 4/2008 |
| JP | 2016012231 | 1/2016 |

(Continued)

OTHER PUBLICATIONS

Ex Parte Quayle Action from U.S. Appl. No. 16/370,930 notified Oct. 22, 2020, 7 pgs.

(Continued)

*Primary Examiner* — Nitin C Patel
(74) *Attorney, Agent, or Firm* — Schwabe, Williamson & Wyatt, P.C.

(57) ABSTRACT

Described are mechanisms and methods for implementing highly configurable power delivery management policies. An apparatus may comprise a first circuitry, a second circuitry, a third circuitry, and a fourth circuitry. The first circuitry may include a memory to store a first table having one or more first entries and to store a second table having one or more respectively corresponding second entries. The second circuitry may, upon the occurrence of an event, test a condition specified by an entry in the first table. The third circuitry may, upon the test of the condition having a positive result, evaluate a set of one or more parameters as specified by an entry in a second table corresponding with the entry in the first table. The fourth circuitry may initiate a power-management action based upon the evaluation of the set of one or more parameters.

22 Claims, 7 Drawing Sheets

(56) References Cited

FOREIGN PATENT DOCUMENTS

| | | |
|---|---|---|
| JP | 20160131440 | 1/2016 |
| KR | 20090046543 | 5/2009 |

OTHER PUBLICATIONS

International Search Report and Written Opinion from PCT/US2020/017542 dated Jun. 16, 2020, 9 pgs.
Notice of Allowance from U.S. Appl. No. 16/370,930 dated Jan. 27, 2021, 7 pgs.

HIGHLY CONFIGURABLE POWER-DELIVERY MANAGEMENT POLICY

CLAIM OF PRIORITY

This application is a continuation of, and claims the benefit of priority to, U.S. patent application Ser. No. 16/370,930, filed on Mar. 30, 2019 and titled "HIGHLY CONFIGURABLE POWER-DELIVERY MANAGEMENT POLICY,' which issued as U.S. Pat. No. 11,009,932 on May 18, 2021, and which is incorporated by reference in entirety.

BACKGROUND

Platform power architectures in modern computer systems (e.g., mobile Personal Computers (PCs)) has become increasingly complex. With the Universal Serial Bus (USB) Type-C port becoming a de facto PC charging port, there may be a wide range of Alternating Current (AC) power levels at play in a computer system. A peak power capability of a battery may vary significantly due to its state-of-charge, its temperature, and potential wear-out conditions. Moreover, detachable designs and dual-display systems may use two battery packs, which may further complicate a power architecture.

Due to this increasing complexity, a large set of parameters and combinations of parameters may be applicable as factors for setting power delivery limits.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bipolar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

System designs may be targeted to support various diverse aspects of system architecture. Some designs may be targeted to support dual batteries, which may discharge sequentially or simultaneously. Some designs may be targeted to support power budget sharing (e.g., between a processor, a discrete graphics component, a display backlight, and so forth). Some designs may be targeted to support processor peak power limits (e.g., to avoid triggering assorted battery-pack protection circuitries). Some designs may be targeted to support proprietary design considerations for setting processor power limits (e.g., customer use of software to limit processor power in order to minimize battery wear-out). Given the expanding set of parameters and combinations of parameters that may be applicable as factors for setting power delivery limits, mechanisms and methods for more accurately managing power may advantageously facilitate optimization of processor peak power and/or maximization of performance while meeting power source constraints (e.g., battery electrical limits).

Disclosed herein are mechanisms and methods for implementing highly configurable power delivery management policies. A policy engine may interface with various modules in a platform. A module in the platform might trigger an event, or might take an action for the policy engine. A module in the platform might also adjust an algorithm of the policy engine by providing one or more configuration tables, which may include condition tables, action tables, and/or algorithm tables.

Condition tables may specify logical tests and/or events that may, when satisfied, trigger a condition module in a platform. The condition module may interface with the policy engine to specify a triggering event or to provide a premise.

Action tables may identify an algorithm that may be used for setting an action module in the platform due to the satisfying of one or more tests in the condition table. The action table may identify one or more variables and/or a formula for an algorithm. If the algorithm evaluates as true, an action (e.g., an adjustment of one or more settings for one or more modules in the platform) may be triggered. For example, a policy engine may indicate one or more actions to a runtime variable manager, which may then process and/or forward such actions (and/or combinations of such actions) to one or more platform modules.

Algorithm tables may have unique identifications (IDs) corresponding with an algorithm or formula. Each row of an algorithm table may specify one or more variables used by the formula. Some variables may be static variables or values (e.g., provided by a system design), and some variables may be runtime variables or parameters. For example, in some embodiments, one or more static variables may be used to select a formula to be used in the algorithm. As another example, in some embodiments, one or more runtime variables may be provided by corresponding software agents that may interface with the policy engine.

The disclosed mechanisms and methods may support highly configurable policies in which policy algorithms may be modified by assigning user-defined variables. These policies may have various advantages relative to hard-coded policies and simple fixed-value lookup-table polices. For example, in comparison with simple fixed-value lookup-table policies, actions calculated using algorithms may advantageously provide higher accuracy.

Moreover, in a mobile Personal Computer (PC), a simple hard-coded policy may reside in an embedded controller or in firmware (e.g., Basic Input/Output System (BIOS)). It may be difficult to support multiple updates to firmware, and as a result the policy may be disposed to being decided early, and/or may be disposed to being kept simple. Accordingly, in comparison with simple hard-coded policies, portions of the policy engine may advantageously be made accessible to software, and a configuration module may advantageously be updated without a firmware change for tuning purposes and/or during debug. This may facilitate simpler and more consistent firmware implementation while using software to implement more sophisticated power delivery policy.

Figure 1:
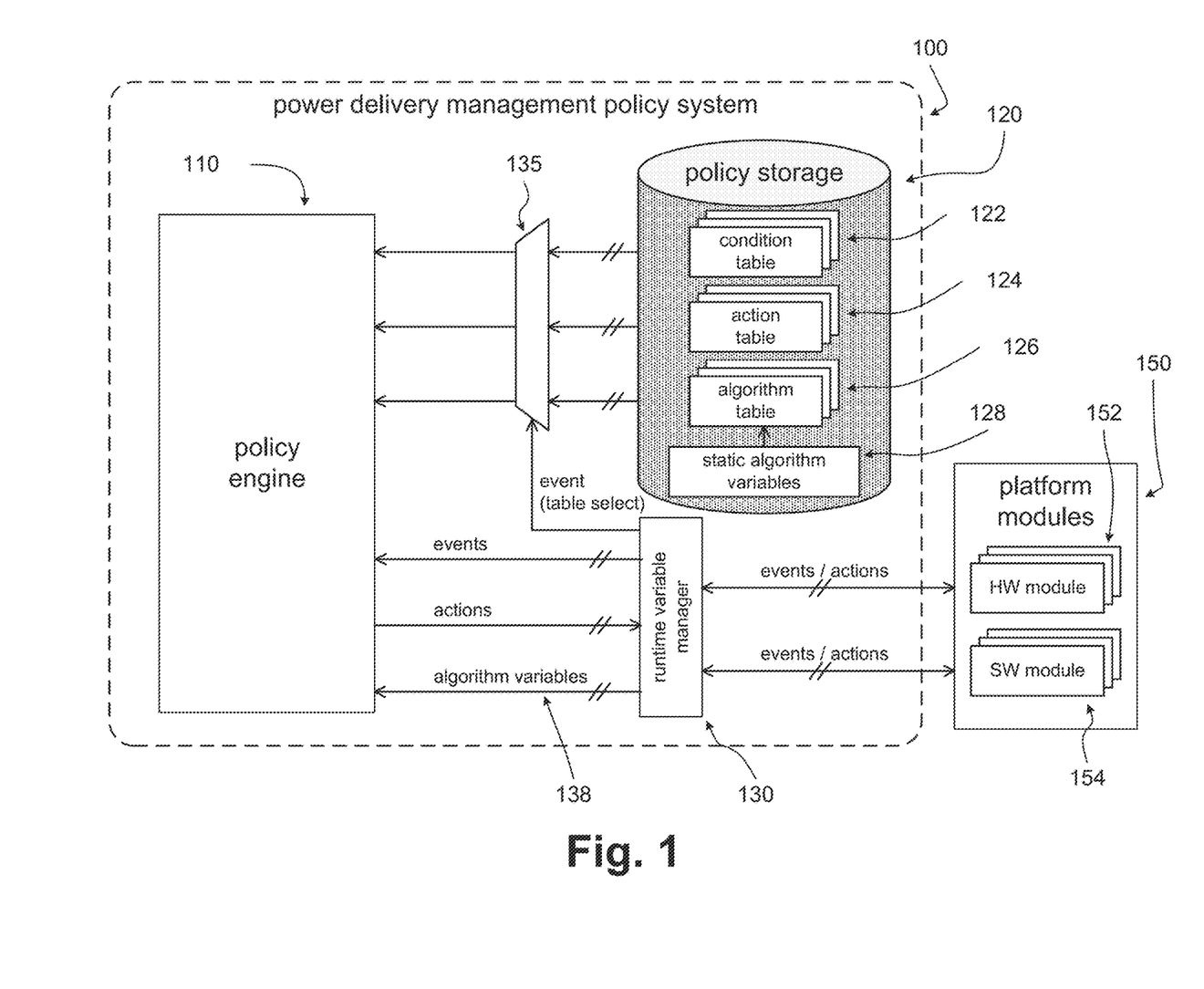
FIG. 1 illustrates a set of components for implementing a power delivery management policy for a system, in accordance with some embodiments of the disclosure.

FIG. 1 illustrates a set of components for implementing a power delivery management policy for a system, in accordance with some embodiments of the disclosure. A power delivery management policy system 100 may comprise a policy engine 110, a policy storage 120, a runtime variable manager 130, and a table selector 135. Power delivery management policy system 100 may interface with a set of platform modules 150, which may include one or more hardware modules 152 and/or one or more software modules 154.

Hardware modules 152 and/or software modules 154 may interface with runtime variable manager 130 and indicate one or more events to runtime variable manager 130. Runtime variable manager 130 may then process and/or forward such events (and/or combinations of such events) to policy engine 110.

Runtime variable manager 130 may also use such events (and/or combinations of such events) to select various configuration tables (e.g., tables of policy storage 120) for access, retrieval, and/or other use by policy engine 110 through table selector 135. The configuration tables selected may include one or more condition tables 122, one or more action tables 124, and/or one or more algorithm tables 126. Different policy configurations may be desirable depending upon various system conditions. For example, different policy configurations may be desirable depending upon whether a system is docked or undocked (e.g., to an Alternating Current (AC) power source).

Based on satisfying one or more conditions of a selected condition table 122, and then satisfying one or more corresponding algorithms of one or more selected algorithm tables 126, policy engine 110 may indicate one or more actions from action tables 124 for platform modules 150 to take.

Policy engine 110 may accordingly be triggered by one or more power-management events in platform modules 150, and may determine one or more power-management actions for platform modules 150. In turn, the determination may ultimately be based on a configured algorithm (e.g., indicated by selected condition tables 122, action tables 124, and algorithm tables 126).

Selected algorithms may depend upon various static variables and/or runtime variables. One or more static variables 128 may be provided to policy engine 110 via a selection from policy storage 120 made by runtime variable manager 130 (e.g., along with an algorithm of an algorithm table 126). One or more runtime variables 138 may be provided to policy engine 110 via runtime variable manager 130.

Figure 2:
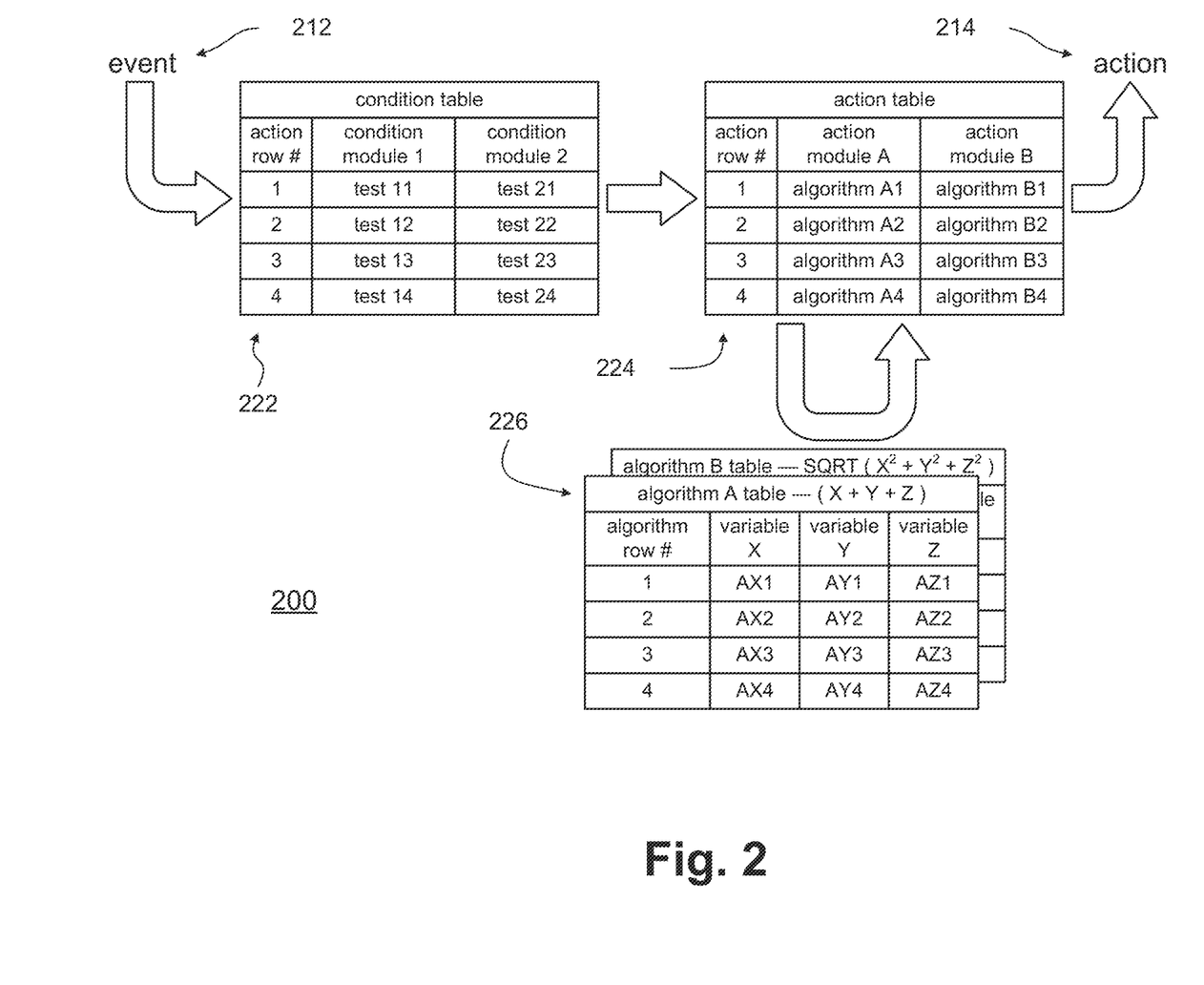
FIG. 2 illustrates a general flow of operation of a policy engine, in accordance with some embodiments of the disclosure.

FIG. 2 illustrates a general flow of operation of a policy engine, in accordance with some embodiments of the disclosure. In a flow of operation 200, a runtime variable manager may pass an event 212 (e.g., from hardware modules and/or software modules) to a policy engine. A condition table 222 may be selected by the runtime variable manager for use by the policy engine. The event 212 may trigger evaluation of one or more tests (corresponding with one or more condition modules) in one or more action rows of condition table 222. In some embodiments, the tests may be evaluated for various action rows in series, while in other embodiments, the tests may be evaluated for various action rows in parallel.

Each action row of the condition table 222 may correspond with an action row of an action table 224 selected by the runtime variable manager for use by the policy engine. If the tests in a given action row of condition table 222 are all satisfied (e.g., if the tests all evaluate as true), then one or more algorithms (corresponding with one or more modules) of the corresponding action row of action table 224 may be executed.

Various action rows of action table 224 may identify or otherwise correspond with algorithms of one or more selected algorithm tables 226 (e.g., algorithm tables selected by the runtime variable manager for use by the policy engine). For example, action rows of action table 224 may corresponding with algorithm rows of the selected algorithm tables 226. The one or more selected algorithm tables 226 may then detail the algorithms to be executed.

Action table 224 may accordingly identify algorithms and/or formula to be evaluated (e.g., by identifying one or more algorithm tables selected by the runtime variable manager), and may also identify variables to be used in evaluating the algorithms and/or formulas (e.g., by identifying rows of algorithm tables 226). In some embodiments, the algorithms for an action row may be evaluated in series, while in other embodiments, the algorithms for the action row may be evaluated in parallel.

If one or more algorithms evaluate as true, the policy engine may indicate a corresponding action 214 to the runtime variable manager. From there, the runtime variable manager may pass action 214 to the hardware modules and/or software modules.

Figure 3:
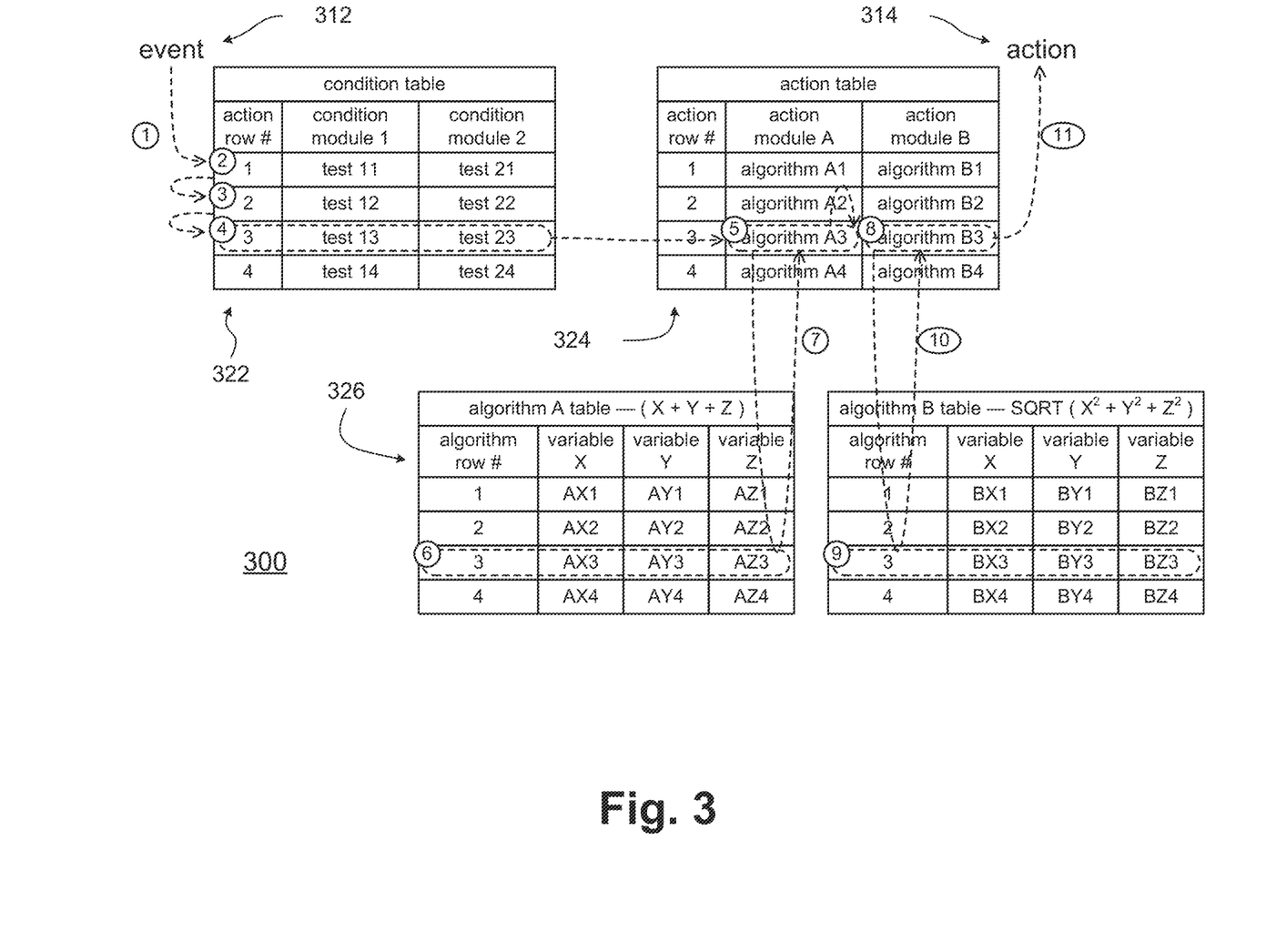
FIG. 3 illustrates an exemplary a flow of operation of a policy engine, in accordance with some embodiments of the disclosure.

FIG. 3 illustrates an exemplary flow of operation of a policy engine, in accordance with some embodiments of the disclosure. In a flow of operation 300, at point 1, an event indicated by a platform module may be passed to a policy engine (e.g., by and/or through a runtime variable manager), and may trigger evaluation of a condition table 322 having one or more action rows, which may in turn specify one or more tests.

In some embodiments, the tests of the action rows may be evaluated in series. For example, at point 2, the tests 312 of a first action row in condition table 322 may be evaluated. If one or more of the tests specified by the first action row are not satisfied (e.g., do not evaluate as being true), then at point 3, the tests of a second action row in condition table 322 may be evaluated. If one or more of the tests specified by the second action row are not satisfied, then at point 4, the tests of a third action row in condition table 322 may be evaluated. If one or more of the tests specified by the third action row are not satisfied, the tests of the fourth action row in condition table 322 may be evaluated.

If all tests in one of the action rows in condition table 322 are satisfied, then the policy engine may move on to evaluate or otherwise execute one or more algorithms of the corresponding action row in action table 324. For example, at point 5, action table 324 may indicate that an algorithm row 3 of an algorithm table 326 for an algorithm A is to be executed. Then, at point 6, the policy engine may evaluate algorithm row 3 of the algorithm table 326 for algorithm A. (That table may indicate an algorithm for the evaluation, and variables for the evaluation may be assigned in accordance with algorithm row 3.)

For example, at point 6, the algorithm to be evaluated may be (X+Y+Z), and the variables may be assigned the values (X=AX3), (Y=AY3), and (Z=AZ3), where AX3, AY3, and/or AZ3 may in turn be static variables (e.g., obtained from a policy storage) or runtime variables (e.g., obtained from platform modules through a runtime variable manager). The algorithm variables might include various parameters mentioned herein, such as a power capability of a battery and/or an AC adapter, for example, or a power consumption of a display backlight and/or a power consumption of an audio speaker. At point 7, the result of evaluating or calculating algorithm A may be assigned to or otherwise associated with the corresponding module of action row 3 of action table 324.

At point 8, action table 324 may indicate that an algorithm row 3 of an algorithm table 326 for an algorithm B is to be executed. Then, at point 9, the policy engine may evaluate algorithm row 3 of the algorithm table 326 for algorithm B. That table may indicate an algorithm for the evaluation, and variables for the evaluation may be assigned in accordance with algorithm row 3.

Accordingly, at point 9, the algorithm to be evaluated may be $(SQRT(X^2+Y^2+Z^2))$, and the variables may be assigned the values (X=BX3), (Y=BY3), and (Z=BZ3), where BX3, BY3, and/or BZ3 may in turn be static variables (e.g., obtained from a policy storage) or runtime variables (e.g., obtained from platform modules through a runtime variable manager). The algorithm variables might include various parameters mentioned herein. At point 10, the result of evaluating or calculating algorithm B may be assigned to or otherwise associated with the corresponding module of action row 3 of action table 324.

In some embodiments, the algorithm variables might include a value of an algorithm or formula corresponding with a previously evaluated or calculated action module. For example, BX3 may be the result of evaluating or calculating algorithm A of algorithm row 3 of the algorithm table 326 for algorithm A.

At point 11, the policy engine may pass an action 314 to the runtime variable manager. For example, based on satisfying algorithm A and algorithm B, an action may be passed to (e.g., may be written to) a platform module (e.g., by and/or through the runtime variable manager).

Figure 4:
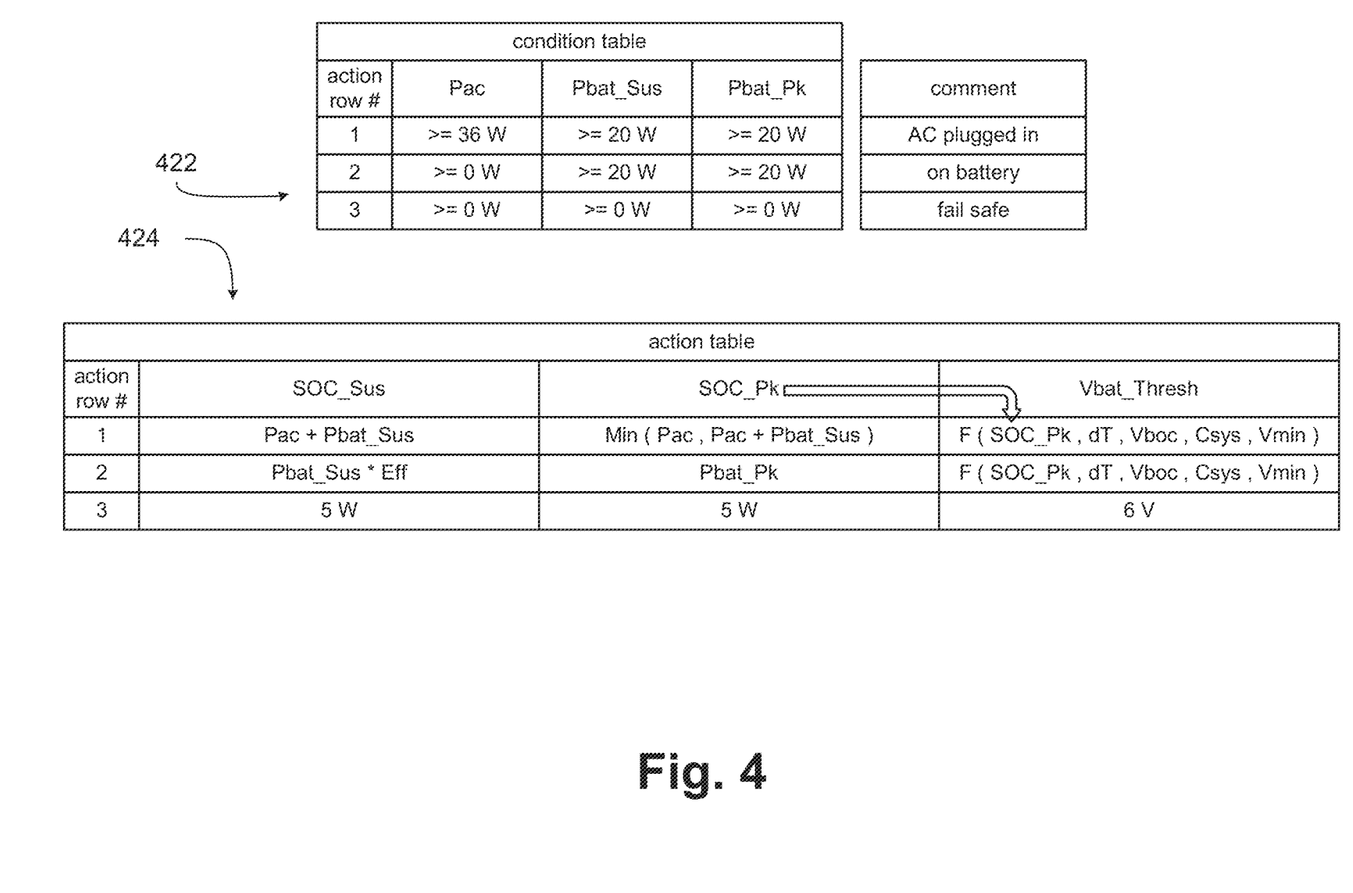
FIG. 4 illustrates details of an exemplary flow of operation of a policy engine, in accordance with some embodiments of the disclosure.

FIG. 4 illustrates details of an exemplary flow of operation of a policy engine, in accordance with some embodiments of the disclosure. A flow of operation may comprise a condition table 422 and an action table 424. Condition table 422 may comprise three action rows, and may comprise three condition modules: a Pac module, a Pbat_Sus module, and a Pbat_Pk module. A first action row, a second action row, and a third action row of condition table 422 may correspond with a first action row, a second action row, and a third action row of action table 424.

The Pac module may pertain to AC power. Pbat_Sus may pertain to a battery sustained power capability estimated by a platform fuel gauge. Pbat_Pk may pertain to a battery peak power capability estimated by the platform fuel gauge. In some embodiments, Pac, Pbat_Sus, and/or Pbat_Pk may be updated at runtime by the platform through Runtime Variable Manager.

The first action row of condition table 422 may be satisfied when Pac is at least 36 watts (W), Pbat_Sus is at least 20 W, and Pbat_pk is at least 20 W. Otherwise, the second action row of condition table 422 may be satisfied when Pbat_Sus is at least 20 W and Pbat_pk is at least 20 W. Otherwise, the third action row of condition table 422 may be satisfied by default. So, for example, the first action row of condition table 422 may be true when AC is plugged in; otherwise, the second action row of condition table 422 may be true when AC is removed (e.g., the system is on battery power); otherwise, the third action row of condition table 422 may be true by default (e.g., as fail-safe values). In some embodiments, for the first action row of condition table 422, Pac may be greater than a valid 36 W level.

For an SOC_Sus action module, an SOC sustained power limit (SOC_Sus) may be calculated at runtime using Pac and Pbat_Sus values provided by the platform using an Advanced Configuration and Power Interface (ACPI) method, as: SOC_Sus=Pac+Pbat_Sus.

For an SOC_Pk action module, an SOC peak power limit (SOC_Pk) may be calculated in runtime using Pac and Pbat_Pk values provided by the platform using an ACPI method, as: SOC_Pk=Min (Pac, Pac+Pbat_Pk).

For a Vbat_Thresh action module, a battery voltage threshold for throttling the SOC (Vbat_Thresh) may use a non-linear function. The non-linear function of Vbat_Thresh may be calculated using: SOC_Pk (e.g., as calculated in an earlier action module of action table 424); a time between a threshold detection and an SOC response to throttling (dT); a capacitance on a battery rail (Csys); a minimum voltage of a battery rail (Vmin); and a battery instantaneous no-load voltage (Vboc).

In various embodiments, Pac, Pbat_Sus, and Vboc may be runtime variables provided by the platform through a runtime variable manager, and dT, Csys, and Vmin may be static variables provided by a policy storage. In various embodiments, the algorithms for the SOC_Sus, SOC_Pk, and Vbat_Thresh action modules may be different, and different Algorithm Tables may accordingly be used.

Figure 5:
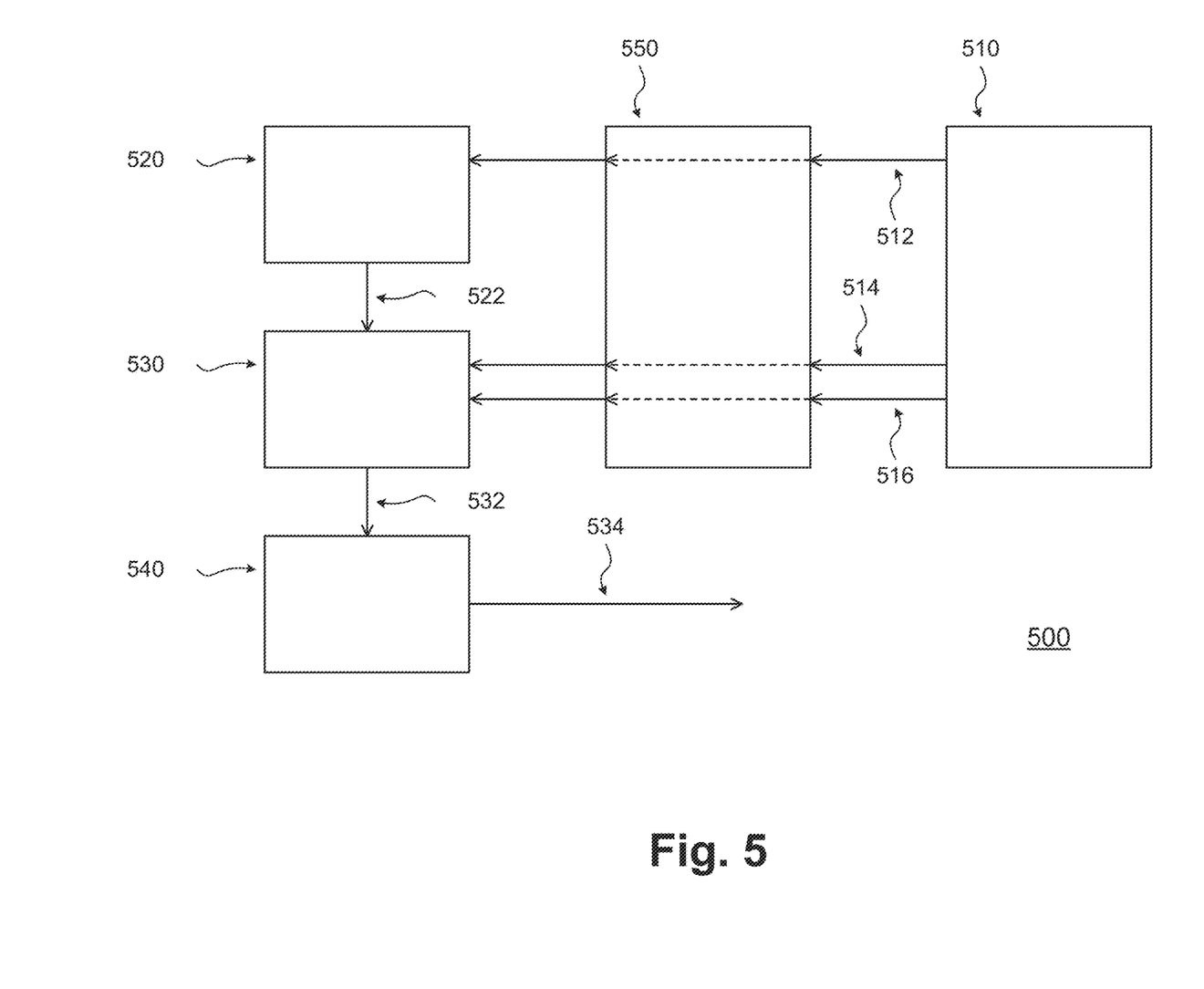
FIG. 5 illustrates circuitries for a power delivery management system, in accordance with some embodiments of the disclosure.

FIG. 5 illustrates circuitries for a power delivery management policy system, in accordance with some embodiments of the disclosure. A power delivery management policy system 500 may comprise a first circuitry 510, a second circuitry 520, a third circuitry 530, and a fourth circuitry 540. In some embodiments, circuitries 500 may comprise a fifth circuitry 550.

In a variety of embodiments, first circuitry 510 may include a memory to store a first table having one or more first entries (e.g., a condition table having one or more action rows) and to store a second table having one or more respectively corresponding second entries (e.g., an action table having one or more action rows). First circuitry 510 may provide information regarding the first table and the first entries to second circuitry 520 via an interface 512. Second circuitry 520 may be operable to, upon the occurrence of an event, test a condition specified by an entry in the first table. First circuitry 510 may provide information regarding the second table and the second entries to third circuitry 530 via an interface 514. Second circuitry 520 may provide information regarding the testing of conditions specified by entries in the first table to third circuitry 530 via an interface 522. Third circuitry 530 may be operable to, upon the test of the condition having a positive result, evaluate a set of one or more parameters as specified by an entry in a second table corresponding with the entry in the first table. Third circuitry 530 may provide information regarding the evaluation of sets of parameters to fourth circuitry 540 via an interface 532. Fourth circuitry 540 may be operable to initiate a power-management action based upon the evaluation of the set of one or more parameters. Fourth circuitry 540 may be operable to provide information regarding the initiation of the power-management action via an interface 534.

In some embodiments, the first entry may comprise a plurality of tests. For example, in some embodiments, the condition may be a first condition, the second circuitry may be operable to, upon the occurrence of the event, test both the first condition and a second condition specified by the entry in the first table, and the third circuitry may be operable to, upon the both the test of the first condition and the test of the second condition having positive results, evaluate the set of one or more parameters as specified by the entry in the second table corresponding with the entry in the first table.

In some embodiments, the second entry may comprise a plurality of sets of parameters. For some embodiments, the set of one or more parameters is a first set of one or more parameters, the third circuitry may be operable to, upon the test of the condition having a positive result, evaluate both the first set of one or more parameters and a second set of one or more parameters as specified by the entry in the second table corresponding with the entry in the first table, and the fourth circuitry may be operable to initiate the power-management action based upon the evaluation of both the first set of one or more parameters and the second set of one or more parameters.

In some embodiments, the evaluation may include a determination of a value of a function of the one or more parameters. For some embodiments, the value of the function of the one or more parameters may be selected from a set of discrete values based upon the value of at least one of the one or more parameters (e.g., the function may be continuous). For some embodiments, the value of the function of the one or more parameters may vary based on a magnitude of at least one of the one or more parameters (e.g., the function may have discrete results, or may be a lookup table).

For some embodiments, the memory may be operable to store a third table having one or more third entries (e.g., an algorithm table having one or more algorithm rows), and the function may be provided by an entry in the third table corresponding with the entry in the second table. First circuitry 510 may provide information regarding the third table and the third entries to third circuitry 530 via an interface 516. In some embodiments, the power-management action may correspond with a power management policy selected from a power control policy, a thermal control policy, a fan control policy, and an adaptive performance policy.

In some embodiments, fifth circuitry 550 may be operable to select the first table from a plurality of first-table candidates. For some embodiments, the power-management action may be a first power-management action, and the fourth circuitry may be operable to initiate a second power-management action based upon the set of one or more parameters.

In a variety of embodiments, first circuitry 510 may include a memory to store a first table having one or more first entries for specifying conditions (e.g., a condition table having one or more action rows) and a second table having one or more second entries for specifying relationships between sets of one or more parameters (e.g., an action table having one or more action rows), the second entries respectively corresponding with the first entries. Second circuitry 520 may be operable to test a condition of a first entry, upon detection of an event. Third circuitry 530 may be operable to, upon the test of the first entry having positive results, evaluate a relationship between a set of one or more parameters of a second entry corresponding with the first entry. Fourth circuitry 540 may be operable to initiate one or more power-management actions based upon the evaluation of the relationship between the set of parameters.

In some embodiments, the condition of the first entry may be a first condition of the first entry, and the relationship between the set of one or more parameters may be a first relationship between a first set of one or more parameters (e.g., the condition table may have a plurality of action rows). The second circuitry may be operable to test both the first condition the first entry and a second condition of the first entry, upon detection of the event. The third circuitry may be operable to evaluate both the first relationship between the first set of one or more parameters and a second relationship between a second set of one or more parameters, upon the tests of both the first condition and the second condition having positive results. The fourth circuitry may be operable to initiate the one or more power-management actions based upon the evaluation of both the first relationship between the first set of parameters and the second relationship between the second set of parameters.

For some embodiments, the relationship may include a function of the one or more parameters. In some embodiments, the value of the function of the one or more parameters may be selected from a set of discrete values based upon the value of at least one of the one or more parameters. In some embodiments, the value of the function of the one or more parameters may vary based on a magnitude of at least one of the one or more parameters.

In some embodiments, the power-management action may correspond with a power management policy selected from a power control policy, a thermal control policy, a fan control policy, and an adaptive performance policy.

In some embodiments, one or more circuitries of power delivery management policy system 500 may be implemented by combinations of software-configured elements and/or other hardware elements. For example, one or more processor and/or one or more memories may be arranged to perform the operations of the circuitries of power delivery management policy system 500.

In some embodiments, first circuitry 510, second circuitry 520, third circuitry 530, fourth circuitry 540, and/or fifth circuitry 550 may be implemented as separate circuitries. In other embodiments, first circuitry 510, second circuitry 520, third circuitry 530, fourth circuitry 540, and/or fifth circuitry 550 may be combined and implemented together in a circuitry without altering the essence of the embodiments.

Figure 6:
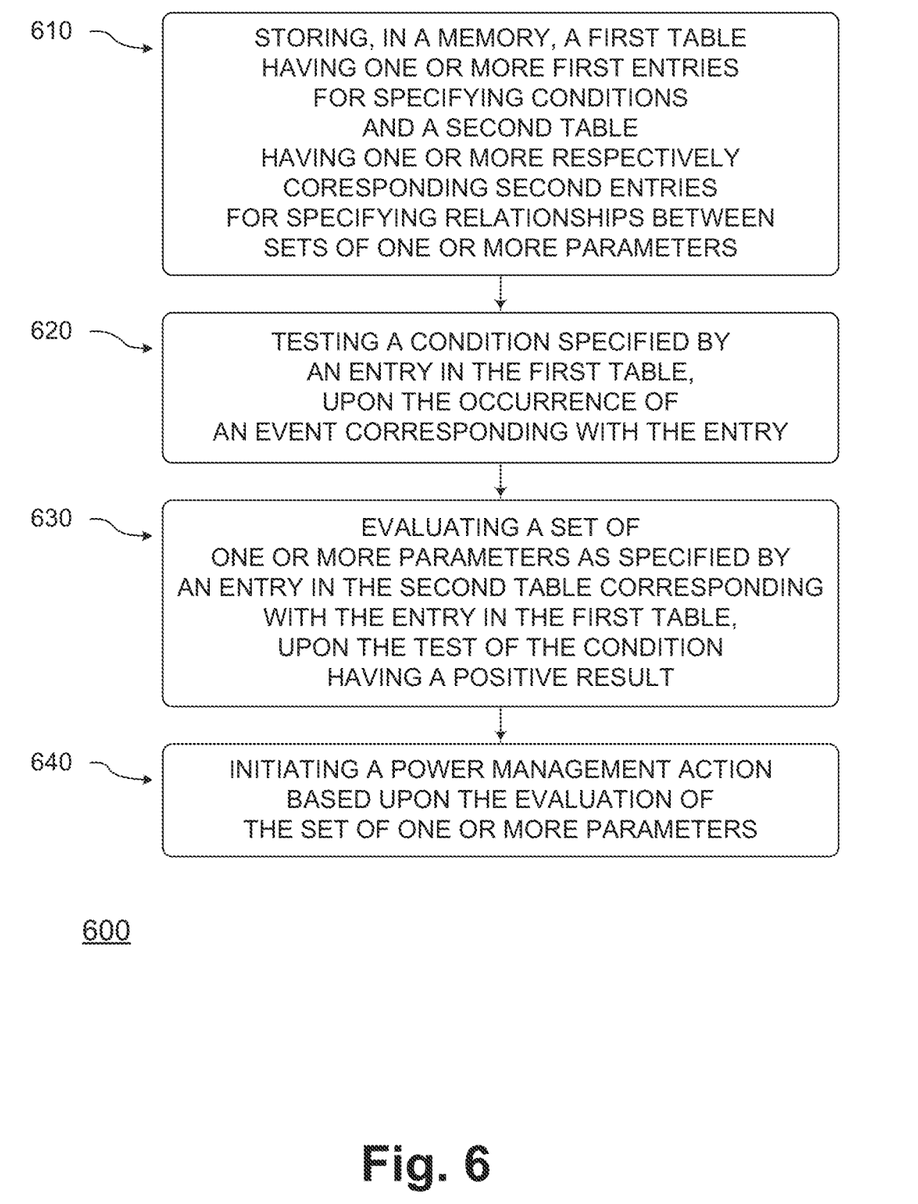
FIG. 6 illustrates methods for a power delivery management system, in accordance with some embodiments of the disclosure.

FIG. 6 illustrates methods for a power delivery management system, in accordance with some embodiments of the disclosure. A method 600 may comprise a block 610, a block 620, a block 630, and/or a block 640.

In block 610, a first table having one or more first entries for specifying conditions (e.g., a condition table having one or more action rows) and a second table having one or more respectively corresponding second entries for specifying relationships between sets of one or more parameters (e.g., an action table having one or more action rows) may be stored in a memory. In block 620; a condition specified by an entry in the first table may be tested, upon the occurrence of an event corresponding with the entry. In block 630, a set of one or more parameters as specified by an entry in the second table corresponding with the entry in the first table may be evaluated, upon the test of the condition having a positive result. In block 640, a power-management action may be initiated based upon the evaluation of the set of one or more parameters.

In some embodiments, the evaluation may include a determination of a value of a function of the one or more parameters. For some embodiments, the power-management action may correspond with a power management policy selected from a power control policy, a thermal control policy, a fan control policy, and an adaptive performance policy. In some embodiments, the memory may be to store a third table having one or more third entries for specifying functions of one or more parameters (e.g., an algorithm table having one or more algorithm rows). For some embodiments, the function may be provided by an entry in the third table corresponding with the entry in the second table.

In some embodiments, the condition may be a first condition, and the set of one or more parameters may be a first set of one or more parameters, and the power-management action is a first power-management action. For some embodiments, upon the occurrence of the event, both the first condition and a second condition specified by the entry in the first table are tested (e.g., two tests of an action row of the condition table are evaluated). For some embodiments, upon the testing of both of the first condition and the second condition having positive results, both the first set of one or more parameters and a second set of one or more parameters specified by the entry in the second table corresponding with the entry in the first table may be evaluated.

Although the blocks in the flowchart with reference to FIG. 6 are shown in a particular order, the order of the blocks can be modified. Thus, the illustrated embodiments can be performed in a different order, and some blocks may be performed in parallel. Some of the blocks and/or operations listed in FIG. 6 are optional in accordance with certain embodiments. The numbering of the blocks presented is for the sake of clarity and is not intended to prescribe an order of operations in which the various actions must occur. Additionally, operations from the various flows may be utilized in a variety of combinations.

In some embodiments, an apparatus may comprise means for performing various blocks and/or operations of the methods of FIG. 6.

Moreover, in some embodiments, machine readable storage media may have executable instructions that, when executed, cause one or more processors to perform an operation comprising a method of FIG. 6. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

Figure 7:
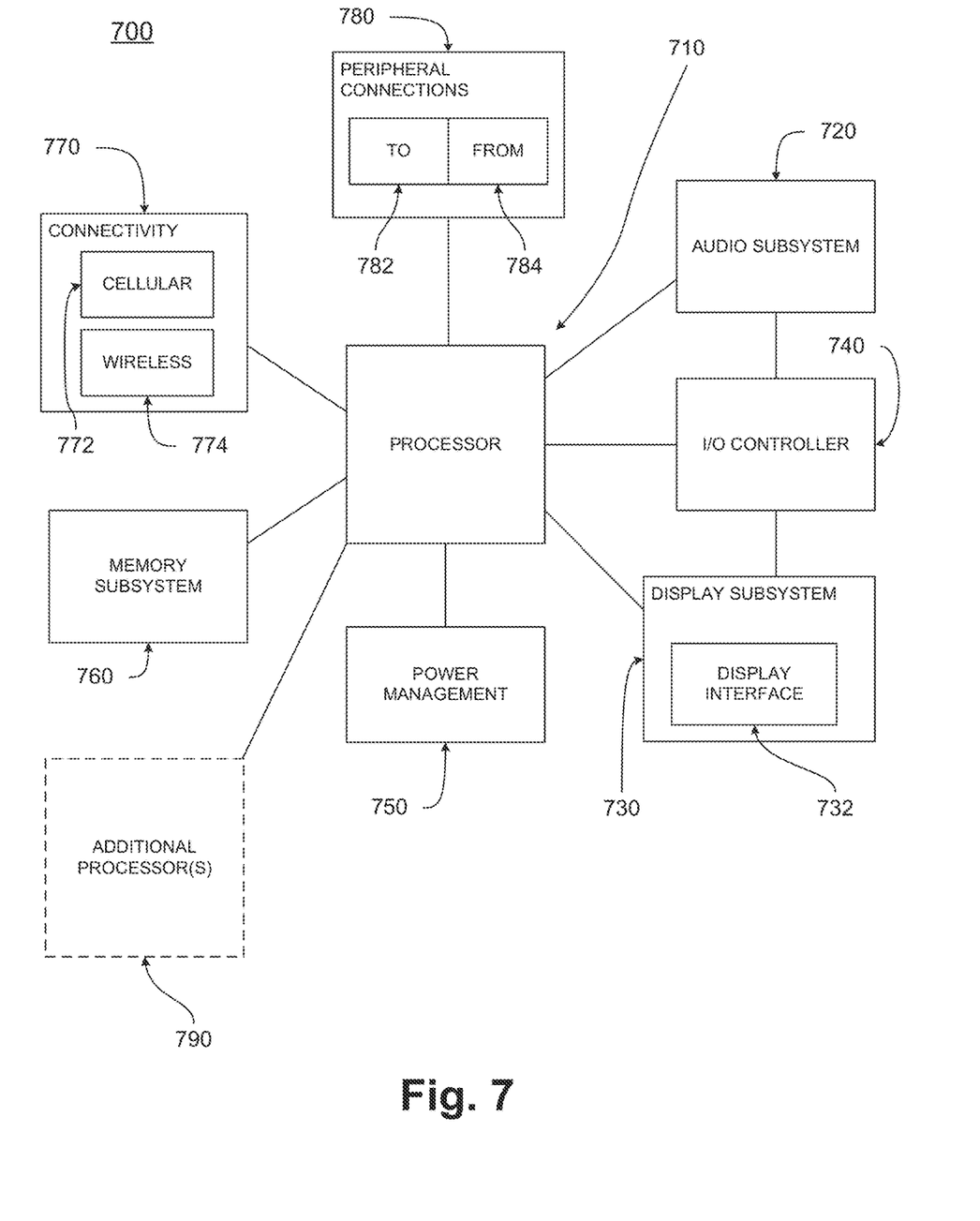
FIG. 7 illustrates a computing device with mechanisms for a power delivery management system, in accordance with some embodiments of the disclosure.

FIG. 7 illustrates a computing device with mechanisms for a power delivery management system, in accordance with some embodiments of the disclosure. Computing device 700 may be a computer system, a System-on-a-Chip (SoC), a tablet, a mobile device, a smart device, or a smart phone with mechanisms for a power delivery management system, in accordance with some embodiments of the disclosure. It will be understood that certain components of computing device 700 are shown generally, and not all components of such a device are shown FIG. 7. Moreover, while some of the components may be physically separate, others may be integrated within the same physical package, or even on the same physical silicon die. Accordingly, the separation between the various components as depicted in FIG. 7 may not be physical in some cases, but may instead be a functional separation. It is also pointed out that those elements of FIG. 7 having the same names or reference numbers as the elements of any other figure can operate or function in any manner similar to that described, but are not limited to such.

In various embodiments, the components of computing device 700 may include any of a processor 710, an audio subsystem 720, a display subsystem 730, an I/O controller 740, a power management component 750, a memory subsystem 760, a connectivity component 770, one or more peripheral connections 780, and one or more additional processors 790. In some embodiments, processor 710 may include mechanisms for a power delivery management system, in accordance with some embodiments of the disclosure. In various embodiments, however, any of the components of computing device 700 may include the mechanisms for a power delivery management system, in accordance with some embodiments of the disclosure. In addition, one or more components of computing device 700 may include an interconnect fabric having a plurality of ports, such as a router, a network of routers, or a Network-on-a-Chip (NoC).

In some embodiments, computing device 700 may be a mobile device which may be operable to use flat surface interface connectors. In one embodiment, computing device 700 may be a mobile computing device, such as a computing tablet, a mobile phone or smart-phone, a wireless-enabled e-reader, or other wireless mobile device. The various embodiments of the present disclosure may also comprise a network interface within 770 such as a wireless interface so that a system embodiment may be incorporated into a wireless device, for example a cell phone or personal digital assistant.

Processor 710 may be a general-purpose processor or CPU (Central Processing Unit). In some embodiments, processor 710 may include one or more physical devices, such as microprocessors, application processors, microcontrollers, programmable logic devices, or other processing means. The processing operations performed by processor 710 may include the execution of an operating platform or operating system on which applications and/or device functions may then be executed. The processing operations may also include operations related to one or more of the following: audio I/O; display I/O; power management; connecting computing device 700 to another device; and/or I/O (input/output) with a human user or with other devices.

Audio subsystem 720 may include hardware components (e.g., audio hardware and audio circuits) and software components (e.g., drivers and/or codecs) associated with providing audio functions to computing device 700. Audio functions can include speaker and/or headphone output as well as microphone input. Devices for such functions can be integrated into computing device 700, or connected to computing device 700. In one embodiment, a user interacts with computing device 700 by providing audio commands that are received and processed by processor 710.

Display subsystem 730 may include hardware components (e.g., display devices) and software components (e.g., drivers) that provide a visual and/or tactile display for a user to interact with computing device 700. Display subsystem 730 may include a display interface 732, which may be a particular screen or hardware device used to provide a display to a user. In one embodiment, display interface 732 includes logic separate from processor 710 to perform at least some processing related to the display. In some embodiments, display subsystem 730 includes a touch screen (or touch pad) device that provides both output and input to a user.

I/O controller 740 may include hardware devices and software components related to interaction with a user. I/O controller 740 may be operable to manage hardware that is part of audio subsystem 720 and/or display subsystem 730. Additionally, I/O controller 740 may be a connection point for additional devices that connect to computing device 700, through which a user might interact with the system. For example, devices that can be attached to computing device 700 might include microphone devices, speaker or stereo systems, video systems or other display devices, keyboard or keypad devices, or other I/O devices for use with specific applications such as card readers or other devices.

As mentioned above, I/O controller 740 can interact with audio subsystem 720 and/or display subsystem 730. For example, input through a microphone or other audio device can provide input or commands for one or more applications or functions of computing device 700. Additionally, audio output can be provided instead of, or in addition to, display output. In another example, if display subsystem 730 includes a touch screen, the display device may also act as an input device, which can be at least partially managed by I/O controller 740. There can also be additional buttons or switches on computing device 700 to provide I/O functions managed by I/O controller 740.

In some embodiments, I/O controller 740 manages devices such as accelerometers, cameras, light sensors or other environmental sensors, or other hardware that can be included in computing device 700. The input can be part of direct user interaction, and may provide environmental input to the system to influence its operations (such as filtering for noise, adjusting displays for brightness detection, applying a flash for a camera, or other features).

Power management component 750 may include hardware components (e.g., power management devices and/or circuitry) and software components (e.g., drivers and/or firmware) associated with managing battery power usage, battery charging, and features related to power saving operation.

Memory subsystem 760 may include one or more memory devices for storing information in computing device 700. Memory subsystem 760 can include nonvolatile memory devices (whose state does not change if power to the memory device is interrupted) and/or volatile memory devices (whose state is indeterminate if power to the memory device is interrupted). Memory subsystem 760 can store application data, user data, music, photos, documents, or other data, as well as system data (whether long-term or temporary) related to the execution of the applications and functions of computing device 700.

Some portion of memory subsystem 760 may also be provided as a non-transitory machine-readable medium for storing the computer-executable instructions (e.g., instructions to implement any other processes discussed herein). The machine-readable medium may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, some embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity component 770 may include a network interface, such as a cellular interface 772 or a wireless interface 774 (so that an embodiment of computing device 700 may be incorporated into a wireless device such as a cellular phone or a personal digital assistant). In some embodiments, connectivity component 770 includes hardware devices (e.g., wireless and/or wired connectors and communication hardware) and software components (e.g., drivers and/or protocol stacks) to enable computing device 700 to communicate with external devices. Computing device 700 could include separate devices, such as other computing devices, wireless access points or base stations, as well as peripherals such as headsets, printers, or other devices.

In some embodiments, connectivity component 770 can include multiple different types of network interfaces, such as one or more wireless interfaces for allowing processor 710 to communicate with another device. To generalize, computing device 700 is illustrated with cellular interface 772 and wireless interface 774. Cellular interface 772 refers generally to wireless interfaces to cellular networks provided by cellular network carriers, such as provided via GSM or variations or derivatives, CDMA (code division multiple access) or variations or derivatives, TDM (time division multiplexing) or variations or derivatives, or other cellular service standards. Wireless interface 774 refers generally to non-cellular wireless interfaces, and can include personal area networks (such as Bluetooth, Near Field, etc.), local area networks (such as Wi-Fi), and/or wide area networks (such as WiMax), or other wireless communication.

Peripheral connections 780 may include hardware interfaces and connectors, as well as software components (e.g., drivers and/or protocol stacks) to make peripheral connections. It will be understood that computing device 700 could both be a peripheral device to other computing devices (via "to" 782), as well as have peripheral devices connected to it (via "from" 784). The computing device 700 may have a "docking" connector to connect to other computing devices for purposes such as managing content on computing device 700 (e.g., downloading and/or uploading, changing, synchronizing). Additionally, a docking connector can allow computing device 700 to connect to certain peripherals that allow computing device 700 to control content output, for example, to audiovisual or other systems.

In addition to a proprietary docking connector or other proprietary connection hardware, computing device 700 can make peripheral connections 780 via common or standards-based connectors. Common types of connectors can include a Universal Serial Bus (USB) connector (which can include any of a number of different hardware interfaces), a DisplayPort or MiniDisplayPort (MDP) connector, a High Definition Multimedia Interface (HDMI) connector, a Firewire connector, or other types of connectors.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus comprising: a first circuitry including a memory to store a first table having one or more first entries and to store a second table having one or more second entries that correspond respectively with the first entries; a second circuitry to, upon the occurrence of an event, test a condition specified by an entry in the first table; a third circuitry to, upon the test of the condition having a positive result, evaluate a plurality of sets of one or more parameters as specified by an entry in a second table that corresponds with the entry in the first table; and a fourth circuitry to initiate a power-management action based upon the evaluation of the plurality of sets of one or more parameters.

In example 2, the apparatus of example 1, wherein the condition is a first condition; wherein the second circuitry is to, upon the occurrence of the event, test both the first condition and a second condition specified by the entry in the first table; and wherein the third circuitry is to, upon the both the test of the first condition and the test of the second condition having positive results, evaluate the plurality of sets of one or more parameters as specified by the entry in the second table that corresponds with the entry in the first table.

In example 3, the apparatus of example 1, wherein the plurality of sets of one or more parameters includes a first set of one or more parameters; wherein the third circuitry is to, upon the test of the condition having a positive result, evaluate both the first set of one or more parameters and a second set of one or more parameters as specified by the entry in the second table that corresponds with the entry in the first table; wherein the fourth circuitry is to initiate the power-management action based upon the evaluation of both the first set of one or more parameters and the second set of one or more parameters.

In example 4, the apparatus of example 1, wherein the evaluation includes a determination of value of a plurality of functions that correspond with the plurality of sets of one or more parameters.

In example 5, the apparatus of example 4, wherein the values of one of the functions that corresponds with the plurality of sets of one or more parameters is selected from a set of discrete values based upon the value of at least one parameter of the set of one or more parameters that corresponds with the function.

In example 6, the apparatus of example 4, wherein the values of one of the functions that corresponds with the plurality of sets of one or more parameters varies based on a magnitude of at least one parameter of the set of one or more parameters that corresponds with the function.

In example 7, the apparatus of example 4, wherein the memory is to store a third table having one or more third entries; and wherein the function is provided by an entry in the third table that corresponds with the entry in the second table.

In example 8, the apparatus of example 1, wherein the power-management action corresponds with a power management policy selected from one of: a power control policy, a thermal control policy, a fan control policy, and an adaptive performance policy.

In example 9, the apparatus of example 1, comprising: a fifth circuitry to select the first table from a plurality of first-table candidates.

In example 10, the apparatus of example 1, wherein the power-management action is a first power-management action; and wherein the fourth circuitry is to initiate a second power-management action based upon the plurality of sets of one or more parameters.

Example 11 provides an apparatus comprising: a first circuitry including a memory to store a first table having one or more first entries that specify conditions and a second table having one or more second entries that specify relationships between sets of one or more parameters and that respectively correspond with the first entries; a second circuitry to test a condition of a first entry, upon detection of an event; a third circuitry to, upon the test of the first entry having positive results, evaluate a plurality of relationships between a plurality of sets of one or more parameters of a second entry that corresponds with the first entry; and a fourth circuitry to initiate one or more power-management actions based upon the evaluation of the plurality of relationships between the plurality of sets of one or more parameters.

In example 12, the apparatus of example 11, wherein the condition of the first entry is a first condition of the first entry, and the plurality of relationships between the plurality of sets of one or more parameters includes a first relationship between a first set of one or more parameters; wherein the second circuitry is to test both the first condition the first entry and a second condition of the first entry, upon detection of the event; wherein the third circuitry is to evaluate both the first relationship between the first set of one or more parameters and a second relationship between a second set of one or more parameters, upon the tests of both the first condition and the second condition having positive results; and wherein the fourth circuitry is to initiate the one or more power-management actions based upon the evaluation of both the first relationship between the first set of parameters and the second relationship between the second set of parameters.

In example 13, the apparatus of example 11, wherein the plurality of relationships includes a plurality of functions that correspond with the plurality of sets of one or more parameters.

In example 14, the apparatus of example 13, wherein the values of one of the functions that corresponds with the plurality of sets of one or more parameters is selected from a set of discrete values based upon the value of at least one parameter of the set of one or more parameters that corresponds with the function.

In example 15, the apparatus of example 13, wherein the values of one of the functions that corresponds with the plurality of sets of one or more parameters varies based on a magnitude of at least one parameter of the set of one or more parameters that corresponds with the function.

In example 16, the apparatus of example 11, wherein the power-management action corresponds with a power management policy selected from one of: a power control policy, a thermal control policy, a fan control policy, and an adaptive performance policy.

Example 17 provides a system comprising a memory, a processor coupled to the memory, and a wireless interface for allowing the processor to communicate with another device, the processor including: a first circuitry including a memory to store a first table having one or more first entries and to store a second table having one or more second entries that respectively correspond with the one or more first entries; a second circuitry to, upon the occurrence of an event, test a condition specified by an entry in the first table; a third circuitry to, upon the test of the condition having a positive result, evaluate a plurality of sets of one or more parameters as specified by an entry in the second table that corresponds with the entry in the first table; and a fourth circuitry to initiate a power-management action based upon the evaluation of the plurality of sets of one or more parameters.

In example 18, the system of example 17, wherein the condition is a first condition, and the plurality of sets of one or more parameters includes a first set of one or more parameters; wherein the second circuitry is to, upon the occurrence of the event, test both the first condition and a second condition specified by the entry in the first table; wherein the third circuitry is to, upon the test of the second condition having a positive result, evaluate both the first set of one or more parameters and a second set of one or more parameters as specified by the entry in the second table that corresponds with the entry in the first table; and wherein the fourth circuitry is to initiate a second power-management action based upon the evaluation of both the first set of one or more parameters and the second set of one or more parameters.

In example 19, the system of example 17, wherein the evaluation includes a determination of values of a plurality of functions that correspond with the plurality of sets of one or more parameters; wherein the memory is to store a third table having one or more third entries; and wherein the function is provided by an entry in the third table that corresponds with the entry in the second table.

In example 20, the system of example 17, wherein the power-management action corresponds with a power management policy selected from one of: a power control policy, a thermal control policy, a fan control policy, and an adaptive performance policy.

Example 21 provides a method comprising: storing, in a memory, a first table having one or more first entries for specifying conditions and a second table having one or more respectively corresponding second entries for specifying relationships between sets of one or more parameters; testing a condition specified by an entry in the first table, upon the occurrence of an event corresponding with the entry; evaluating a plurality of sets of one or more parameters as specified by an entry in the second table corresponding with the entry in the first table, upon the test of the condition having a positive result; and initiating a power-management action based upon the evaluation of the plurality of sets of one or more parameters.

In example 22, the method of example 21, wherein the evaluation includes a determination of a value of a plurality of functions corresponding with the plurality of sets of one or more parameters. wherein the power-management action corresponds with a power management policy selected from one of: a power control policy, a thermal control policy, a fan control policy, and an adaptive performance policy.

In example 23, the method of example 22, wherein the memory is to store a third table having one or more third entries for specifying the plurality of functions corresponding with the plurality of sets of one or more parameters; and wherein the function is provided by an entry in the third table corresponding with the entry in the second table.

In example 24, the method of example 21, wherein the condition is a first condition, and the plurality of sets of one or more parameters includes a first set of one or more parameters; wherein, upon the occurrence of the event, both the first condition and a second condition specified by the entry in the first table are tested; wherein, upon the testing of both of the first condition and the second condition having positive results, both the first set of one or more parameters and a second set of one or more parameters specified by the entry in the second table corresponding with the entry in the first table are evaluated.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. One or more non-transitory machine-readable storage media having one or more instructions that when executed cause one or more machines to perform a method comprising: testing a condition specified by an entry in a first table, wherein the testing occurs based on an event corresponding to the entry in the first table;
   evaluating a plurality of sets of one or more parameters as specified in an entry in a second table corresponding with the entry in the first table, wherein the evaluating occurs based on the testing of the condition resulting in a positive result; and
   initiating a power-management action based on the evaluating of the plurality of sets of one or more parameters.

2. The one or more non-transitory machine-readable storage media of claim 1, wherein evaluating the plurality of sets of one or more parameters comprises:
   determining a value of a plurality of functions corresponding to the plurality of sets of one or more parameters.

3. The one or more non-transitory machine-readable storage media of claim 1, wherein the power-management action corresponds with a power-management policy.

4. The one or more non-transitory machine-readable storage media of claim 3, wherein the power-management policy includes: a power control policy, a thermal control policy, a fan control policy, and an adaptive performance policy.

5. The one or more non-transitory machine-readable storage media of claim 1, wherein the condition is a first condition, and the plurality of sets of one or more parameters includes a first set of one or more parameters; wherein, upon an occurrence of the event, both the first condition and a second condition specified by the entry in the first table are tested.

6. The one or more non-transitory machine-readable storage media of claim 5, having one or more instructions that when executed cause the one or more machines to perform a further method comprising:
   evaluating the first set of one or more parameters and a second set of one or more parameters specified by the entry in the second table corresponding with the entry in the first table, upon testing of both the first condition and the second condition having positive results.

7. The one or more non-transitory machine-readable storage media of claim 1, wherein the first table comprises one or more first entries for specifying conditions, and wherein the first table is stored in a memory.

8. The one or more non-transitory machine-readable storage media of claim 7, wherein the second table comprises one or more second entries corresponding to the one or more first entries, wherein the second entries are for specifying relationships between the plurality of sets of one or more parameters.

9. The one or more non-transitory machine-readable storage media of claim 8, wherein the memory is to store a third table having one or more third entries for specifying a plurality of functions corresponding with the plurality of sets of one or more parameters.

10. The one or more non-transitory machine-readable storage media of claim 9, wherein a function on the plurality of functions is provided by an entry in the third table corresponding to an entry in the second table.

11. An apparatus comprising: a first circuitry to test a condition specified by an entry in a first table, wherein the test occurs based on an event corresponding to the entry in the first table;
    a second circuitry to evaluate, based on the test of the condition being a positive result, a plurality of sets of one or more parameters as specified in an entry in a second table corresponding with the entry in the first table; and
    a third circuitry to initiate a power-management action based on the evaluating of the plurality of sets of one or more parameters.

12. An apparatus comprising:
    a memory to store a first table and a second table; and
    a processor circuitry coupled to the memory, wherein the processor circuitry is to execute instructions to cause an operation comprising:
    test a condition specified by an entry in the first table, wherein the test occurs based on an event corresponding to the entry in the first table;

evaluate, based on the test of the condition being a positive result, a plurality of sets of one or more parameters as specified in an entry in the second table corresponding with the entry in the first table; and initiate a power-management action based on the evaluating of the plurality of sets of one or more parameters.

13. The apparatus of claim 12, wherein the processor circuitry is to determine a value of a plurality of functions corresponding to the plurality of sets of one or more parameters to evaluate the plurality of sets of one or more parameters.

14. The apparatus of claim 12, wherein the power-management action corresponds with a power-management policy.

15. The apparatus of claim 14, wherein the power-management policy includes: a power control policy, a thermal control policy, a fan control policy, and an adaptive performance policy.

16. The apparatus of claim 12, wherein the condition is a first condition, and the plurality of sets of one or more parameters includes a first set of one or more parameters; wherein, upon an occurrence of the event, both the first condition and a second condition specified by the entry in the first table are tested.

17. The apparatus of claim 16, wherein the processor circuitry is to:

evaluate a first set of one or more parameters and a second set of one or more parameters specified by the entry in the second table corresponding with the entry in the first table, upon test of both a first condition and a second condition being positive results.

18. The apparatus of claim 12, wherein the first table comprises one or more first entries for specifying conditions, and wherein the first table is stored in the memory, wherein the second table comprises one or more second entries corresponding to the one or more first entries, wherein the second entries are for specifying relationships between the plurality of sets of one or more parameters.

19. The apparatus of claim 18, wherein the memory is to store a third table having one or more third entries for specifying a plurality of functions corresponding with the plurality of sets of one or more parameters, wherein a function on the plurality of functions is provided by an entry in the third table corresponding to the entry in the second table.

20. The apparatus of claim 11, wherein the second circuitry is to determine a value of a plurality of functions corresponding to the plurality of sets of one or more parameters, to evaluate the plurality of sets of one or more parameters.

21. The apparatus of claim 20, wherein the power-management action corresponds with a power-management policy.

22. The apparatus of claim 21, wherein the power-management policy includes: a power control policy, a thermal control policy, a fan control policy, and an adaptive performance policy.

* * * * *